US012785402B2

(12) United States Patent
Jasim et al.

(10) Patent No.: US 12,785,402 B2
(45) Date of Patent: Nov. 3, 2026

(54) COMMISSIONING OF BIPOLE POWER TRANSMISSION NETWORKS

(71) Applicant: GE Infrastructure Technology LLC, Greenville, SC (US)

(72) Inventors: Omar Jasim, Stafford (GB); Amit Kumar, Stafford (GB); Anthony Totterdell, Stafford (GB)

(73) Assignee: GE VERNOVA INFRASTRUCTURE TECHNOLOGY LLC, Greenville, SC (US)

( * ) Notice: Subject to any disclaimer, the term of this patent is extended or adjusted under 35 U.S.C. 154(b) by 136 days.

(21) Appl. No.: 18/945,307

(22) Filed: Nov. 12, 2024

(65) Prior Publication Data

US 2025/0175002 A1 May 29, 2025

(30) Foreign Application Priority Data

Nov. 24, 2023 (EP) .................................... 23212131

(51) Int. Cl.
*H02J 3/36* (2026.01)
*H02J 3/001* (2026.01)
*H02J 101/22* (2026.01)
*H02J 101/28* (2026.01)
*H02J 103/35* (2026.01)

(52) U.S. Cl.
CPC ................ *H02J 3/36* (2013.01); *H02J 3/001* (2020.01); *H02J 2101/22* (2026.01); *H02J 2101/28* (2026.01); *H02J 2103/35* (2026.01)

(58) Field of Classification Search
CPC .......... H02J 3/001; H02J 3/36; H02J 2101/22; H02J 2101/28; H02J 2103/35
See application file for complete search history.

(56) References Cited

U.S. PATENT DOCUMENTS

2009/0316446 A1* 12/2009 Astrom .................. H02H 7/268 363/35
2020/0266721 A1* 8/2020 Mukhedkar ............... H02J 3/36
2023/0318301 A1* 10/2023 Kumar ...................... H02J 3/36 307/82

OTHER PUBLICATIONS

Extended European Search Report issued in EP Application No. 23212131.9 dated Jul. 3, 2024, 14 pages.

(Continued)

*Primary Examiner* — Jue Zhang
(74) *Attorney, Agent, or Firm* — Eversheds Sutherland (US) LLP

(57) ABSTRACT

A computer-implemented method of controlling a bipole power transmission network including first, second, third and fourth power converters, a first electrical pole, a second electrical pole, and a neutral arrangement. The method including: configuring the first and second power converters to regulate first and second DC voltages of the first and second electrical poles; configuring the third and/or fourth power converter to control an AC voltage output from the third or fourth AC sides; configuring the third and/or fourth power converter to be synchronized to the AC voltage; and controlling the third and/or fourth power converter to regulate an AC power at the third or fourth AC side and/or to regulate a DC power at the third or fourth DC side, as function of: a measured value of a first electrical current flowing through the neutral arrangement; and a reference value for the first electrical current.

15 Claims, 11 Drawing Sheets

(56) References Cited

OTHER PUBLICATIONS

Puricelli et al.: Study of Low-Frequency Interactions between Grid-Forming MMCs located on both sides of a Bipolar HVDC link. 2023 IEEE PES Innovative Smart Grid Technologies Europe (ISGT Europe), Grenoble, France, 2023, pp. 1-5.

* cited by examiner

COMMISSIONING OF BIPOLE POWER TRANSMISSION NETWORKS

FIELD

The subject matter herein relates generally to the field of power transmission networks and more specifically to commissioning bipole power transmission networks.

BACKGROUND

In high voltage direct current (HVDC) power transmission networks, alternating current (AC) power is typically converted to direct current (DC) power for transmission via overhead lines, under-sea cables and/or underground cables. This conversion removes the need to compensate for the AC reactive/capacitive load effects imposed by the power transmission medium, i.e. the transmission line or cable, and reduces the cost per kilometre of the lines and/or cables, and thus becomes cost-effective when power needs to be transmitted over a long distance. DC power can also be transmitted directly from offshore wind parks to onshore AC power transmission networks, for instance.

The conversion between DC power and AC power is utilised where it is necessary to interconnect DC and AC networks. In any such power transmission network, power conversion means also known as converters (i.e. power converters in converter stations) are required at each interface between AC and DC power to effect the required conversion from AC to DC or from DC to AC.

The choice of the most suitable HVDC power transmission network or scheme depends on the particular application and scheme features. Examples of power transmission networks include monopole power transmission networks and bipole power transmission networks.

Generally, a HVDC power transmission network is supplied by a manufacturer that is different to the manufacturer supplying the AC network/s to which the HVDC network is to be connected. For instance, an offshore windfarm manufacturer is generally different to the HVDC network manufacturer. The existence of different manufacturers tends to lead to a requirement whereby the HVDC network needs to be commissioned before the offshore windfarm is commissioned.

SUMMARY

The HVDC power transmission network used with offshore windfarms is typically a bipole power transmission network. A bipole power transmission network comprises at least two converter stations (for instance one on-shore and one-offshore) that are connected by first and second electrical poles (for instance a positive polarity pole and a negative polarity pole) and a neutral arrangement. In order to commission a bipole power transmission network, a mode of operation referred to as "round-power" is utilized that allows power to flow from the first converter station to the second converter station, and back again, via the electrical poles.

More specifically, in the round-power mode of operation, the connections for the onshore power converters in the onshore converter station, are the same as in normal power transfer modes. However, the offshore power converters are operated in a coupled mode (i.e. the AC side of the offshore power converters—which may represent a 66 kV network-are coupled. Moreover, connections to the offshore windfarm itself are open. Such a mode is only used for commissioning of the HVDC power transmission network, and, as such, requires a special control methodology that is different from normal operating modes (i.e., STATCOM and power transfer modes).

The round-power mode of operation circulates power around a bipole HVDC power transmission network. More specifically, power is transferred from a first (i.e. onshore) converter station to a second (i.e. offshore) converter station, via a first electrical pole. The power is then returned to the first converter station, from the second converter station, via the second electrical pole. Hence one electrical pole sends power in one direction, with the other electrical pole sending power in the other direction. Generally, power is not consumed other than owing to system losses. However, because the electrical poles have different polarities, a problem arises with respect to the flow of electrical current. The electrical current flow is in the same direction for both electrical poles. Hence the sum of the electrical current returns through the neutral arrangement i.e. via the dedicated metallic return (DMR). A risk arises whereby the electrical current returning through the neutral arrangement can exceed the electrical rating of the neutral arrangement. This can have undesirable consequences including damage to one or more electrical components of the neutral arrangement and/or tripping of the HVDC scheme.

It is desirable to provide a method of controlling a bipole power transmission network that mitigates these issues.

According to a first aspect of the invention, there is provided a computer-implemented method of controlling a bipole power transmission network, the bipole power transmission network comprising a first power conversion means comprising first and second power converters having respective first and second alternating current (AC) sides and respective first and second direct current (DC) sides, a second power conversion means comprising third and fourth power converters having respective third and fourth AC sides and respective third and fourth DC sides, a first power transmission means electrically connected between the first and third DC sides and defining a first electrical pole, a second power transmission means electrically connected between the second and fourth DC sides and defining a second electrical pole, and a neutral arrangement connected to the first, second, third and fourth DC sides, wherein the first and second AC sides are electrically connected to an AC network, and wherein the third and fourth AC sides are electrically connected to each other, the method comprising: configuring the first and second power converters to regulate respective first and second DC voltages of the first and second electrical poles; configuring the third and/or fourth power converter to control an AC voltage output from the respective third or fourth AC side; configuring the third and/or fourth power converters to be synchronised to the AC voltage; and controlling the third and/or fourth power converter to regulate an AC power at the respective third or fourth AC side and/or to regulate a DC power at the respective third or fourth DC side, as function of: a measured value of a first electrical current flowing through the neutral arrangement; and a reference value for the first electrical current; such that, in-use, electrical power from the AC network flowing from the first power conversion means to the second power conversion means and returning to the first power conversion means, or vice-versa, is regulated to control the first electrical current in accordance with the reference value.

The inventors have realized that during commissioning of a bipole power transmission network, when the third and fourth power converters are connected to each other to allow for the circulation of power, one of the converters acts essentially as a rectifier whilst the other acts essentially as an inverter. By setting one of the converters as a "master" (i.e., in grid forming control mode) controlling the AC voltage (i.e. magnitude and frequency, using a voltage controlled oscillator), the other converter can be a "slave" (i.e., acting in grid following mode or synchronous grid forming control mode) and synchronized to the master using, for instance, a Phase Locked Loop (PLL). This converter can be operated in power control mode to regulate the power flow through the bipole network. However, merely controlling the converters in this manner is not sufficient to fully protect the bipole power transmission scheme. The scheme still must be controlled in a manner to protect the neutral arrangement and the components therein. Therefore, the invention described herein tends to monitor the first electrical current in the neutral arrangement (i.e. the current flowing in the DMR) and automatically takes action to ensure the first electrical current is controlled in accordance with the reference value (i.e., does not exceed the reference value). More specifically this tends to be achieved by, the power flowing to the third or fourth power converter being regulated as a function of the electrical current in the neutral arrangement and the reference value. This can be realized by programming a controller of the slave converter to change a power order reference or AC voltage reference of the converter as a function of the measured first electrical current, so as to keep the maximum current flowing through the neutral pole conductor within its maximum current rating. This allows for a round-power operation of the bipole power transmission network for commissioning purposes, whilst ensuring that the neutral arrangement and associated components are not subjected to electrical current beyond their rating (i.e., ensuring the HVDC scheme is protected).

The 'function' itself may be implemented as a mathematical function, a look-up type table or function, or other control logic as described herein (one such option is detailed in FIG. 6). Put differently, the AC power/DC power is regulated based on the measured value and reference value for the first electrical current.

In some embodiments, the reference value is based on a maximum current rating of one or more components of the neutral arrangement. In other embodiments, the reference value may be a value settable by an operator (i.e., it could be a derived reference current value based on an operator settable power demand for a round-power mode of operation).

By providing a reference value that is based on a predetermined maximum current rating of one or more components, the related components can be protected from electrical currents that would cause damage or disrupt their operation. Put differently, the reference value can be tailored to the components of the neutral arrangement. The reference value may be 1 per unit (PU) for instance, or may be 0.9, 0.75, 0.5, 0.3, 0.2, 0.1 PU. Such reference values are not intended to be limiting, but moreover to illustrate that the reference value can be tailored to the particular HVDC scheme. In some schemes, for instance, a reference value greater than 1 PU may be employed, if the respective scheme comprises a DMR cable having a rating that allows for a reference value greater than 1 PU to be used.

In some embodiments, the one or more components are selected from the list of components consisting of: a surge arrestor; a neutral switchgear; and a DMR cable/conductor.

Certain components of the neutral arrangement may be more susceptible to electrical currents in excess of their individual ratings i.e., may be more likely to incur irreparable damage or more likely to cause a tripping of the HVDC scheme. In addition, certain components may be more expensive to replace, or more challenging to replace. The list of components described herein represent such components.

In some embodiments, the controlling the third and/or fourth power converter to regulate an AC power comprises introducing a difference between a phase angle of the AC voltage output by the third converter and a phase angle of the AC voltage output by the fourth converter, as a function of the measured value and reference value. The difference in phase angle may be measured at a point of common coupling of the first electrical pole and the second electrical pole. The difference in phase angle may be adjusted to drive the power demand of the second electrical pole in a manner to ensure the measured value of the neutral current does not exceed the reference value. In these embodiments, the third and fourth power converters may be controlled in Vac voltage and frequency mode (i.e., grid forming control mode).

In some embodiments, the controlling the third and/or fourth converter to regulate the AC power or the DC power, comprises: adjusting a reference power or a reference voltage of the third or fourth converters.

In some embodiments, the reference power or reference voltage is selected from the list consisting of: a power-order reference; an AC reference voltage; a DC reference voltage; and a valve reference voltage.

By adjusting the reference power or reference voltage, the power infeed/incoming power of the power converter can be adjusted. The power converter tends to respond to the reference power or reference voltage by amending an internal AC voltage angle to achieve the desired (i.e., requested) power corresponding to the reference power or reference voltage.

In some embodiments, the adjusting a reference power or reference voltage, comprises: adjusting the reference power or reference voltage and determining a corresponding nominal measured value of the first electrical current, repeatedly, until the nominal measured value of the first electrical current is substantially equal to the reference value; and then maintaining the respective reference power or reference voltage providing the nominal measured value that is substantially equal to the reference value.

By repeatedly monitoring the first electrical current and adjusting the reference power or reference voltage, the power infeed to the third or fourth converter is repeatedly amended until a desired current is achieved in the neutral arrangement. Put differently, the first electrical current is controlled to the predefined value of the reference value and round-power mode is achieved.

In some embodiments, the configuring the first and second power converters to regulate respective first and second DC voltages of the first and second electrical poles, comprises: configuring the first and second power converters to operate in either of: a grid following configuration; or a synchronous grid forming configuration. The methods described herein have broad utility during commissioning of power transmission networks with first and second power converters operating in either of grid following or grid forming modes. Either mode regulates the DC voltages using DC voltage control i.e., if the DC voltage is lower than a set value, more power in pumped into the DC system; or if the DC voltage is higher than a set value, more power is extracted from the DC system.

In some embodiments, the configuring the third and/or fourth power converter to control the AC voltage, comprises: controlling the third or fourth power converter to operate in a grid forming configuration, wherein the third or fourth power converter regulates a magnitude and a frequency of the AC voltage.

By controlling the third or fourth power converter to operate in a grid forming configuration, one converter is made a master converter forming an AC voltage source. The AC voltage source provides the magnitude of the voltage and regulates the fixed frequency, such that a phase angle to form the AC voltage can be determined.

In some embodiments, the first power conversion means is an onshore converter station, and the second power conversion means is an offshore converter station.

Windfarms generally have a different manufacturer to that of the HVDC power transmission network to which the windfarm will be connected. Hence the HVDC power transmission network will generally require commissioning before the windfarm. Therefore, bipole power transmission networks comprising offshore and onshore converter stations, as are used in windfarm/windpower applications, are of particular relevance to the invention described herein.

In some embodiments, the bipole power transmission network is a high voltage direct current (HVDC) power transmission network.

HVDC power transmission networks utilize power converters and require commissioning using operating methods such as round-power, for which the problems hereinbefore mentioned occur. The invention described herein provides a solution to these problems.

In some embodiments, each of the power converters comprises a voltage sourced converter (VSC), preferably a modular multilevel (MMC) converter.

VSCs can be operated in bipole power transmission networks that use operating methods such as round-power, for which the problems hereinbefore mentioned occur. The invention described herein provides a solution to these problems.

According to a second aspect of the invention, there is provided a controller for a bipole power transmission network, comprising: a memory; and at least one processor; wherein the memory comprises computer-readable instructions which when executed by the at least one processor, cause the controller to perform the method of the first aspect of the invention. The controller may be a single controller or may be considered, generally, as a control means, comprising a plurality of controllers distributed across the bipole power transmission network and collectively performing the methods described herein.

According to a third aspect of the invention there is provided a bipole power transmission network, comprising: a first power conversion means, comprising: a first power converter having a first AC side and a first DC side; a second power converter having a second AC side and a second DC side; a second power conversion means, comprising: a third power converter having a third AC side and a third DC side; a fourth power converter having a fourth AC side and a fourth DC side; a first power transmission means connected between the first DC side and the third DC side, thereby defining a first electrical pole; a second power transmission means electrically connected between the second DC side and the fourth DC side, thereby defining a second electrical pole; a neutral arrangement electrically connected to the first, second, third and fourth DC sides; wherein the first and second AC sides are electrically connected to an AC network, and wherein the third and fourth AC sides are electrically connected to each other; wherein the bipole power transmission network further comprises the controller of the second aspect of the invention.

The bipole power transmission network is arranged in what may be considered as a 'test configuration'. More specifically, the third and fourth AC sides, which are for connecting to another AC network (i.e., a windfarm) in normal operation, are in the present disclosure, connected to each other (for instance via an AC bus). This allows for the round-power operation. It will be understood that the third and fourth AC sides being connected together may be via a switch or switchgear, that during normal operation of the bipole power transmission system, may be open, and during testing/commissioning, may be closed.

According to a fourth aspect of the invention, there is provided a computer program comprising instructions which when executed by a controller for a bipole power transmission network, cause the controller to perform the method of the first aspect of the invention.

According to a fifth aspect of the invention, there is provided a non-transitory computer-readable storage medium comprising the computer program of the fourth aspect of the invention.

It will be appreciated that particular features of different aspects of the invention share the technical effects and benefits of corresponding features of other aspects of the invention. More specifically, the controller, power transmission network, computer program, non-transitory computer-readable medium, share the technical effects and benefits of the computer-implemented method of the invention.

It will also be appreciated that the use of the terms "first" and "second", and the like, are merely intended to help distinguish between similar features and are not intended to indicate a relative importance of one feature over another, unless otherwise specified.

Within the scope of this application it is expressly intended that the various aspects, embodiments, examples and alternatives set out in the preceding paragraphs, and the claims and/or the following description and drawings, and in particular the individual features thereof, may be taken independently or in any combination. That is, all embodiments and all features of any embodiment can be combined in any way and/or combination, unless such features are incompatible.

BRIEF DESCRIPTION OF THE DRAWINGS

Embodiments of the invention will now be described by way of example only and with reference to the accompanying drawings, in which.

DETAILED DESCRIPTION

Figure 1:
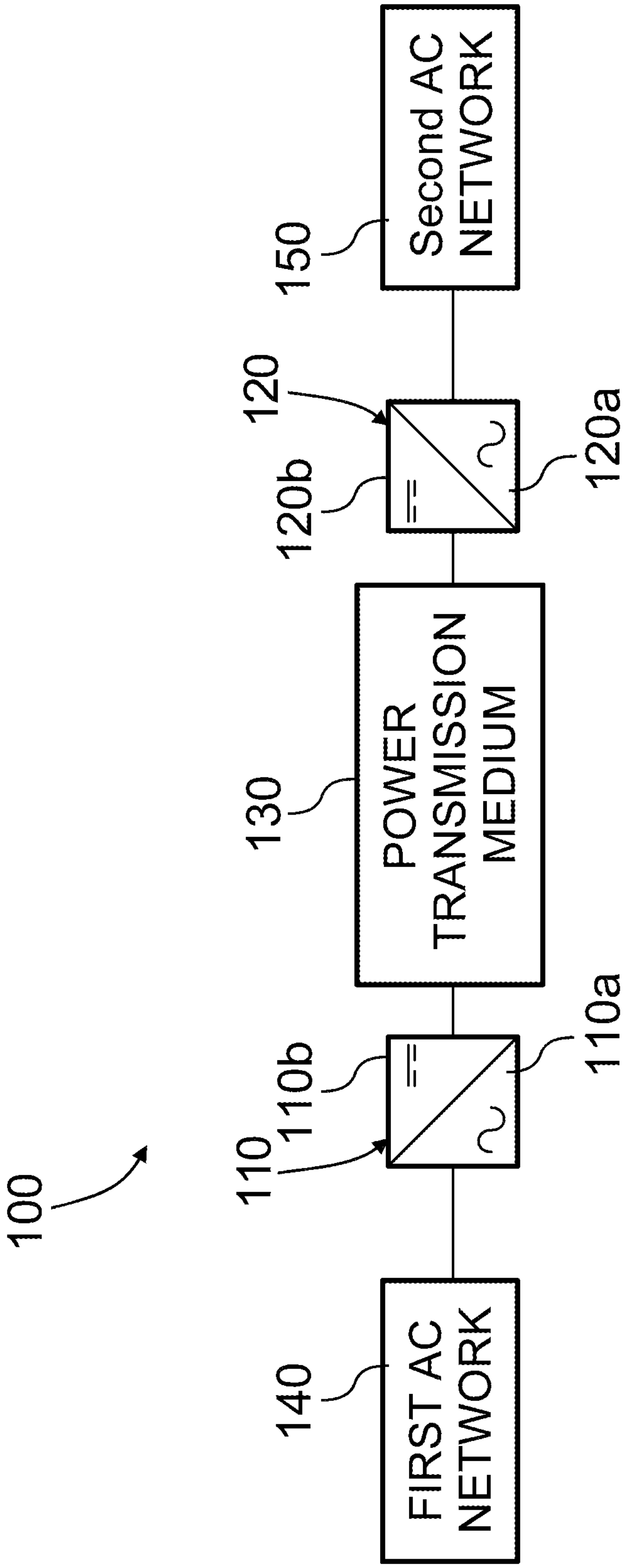
FIG. 1 shows generically, an example of a power transmission network.

FIG. 1 illustrates generically, an example of a power transmission network 100. The illustration is not intended to be limited to representing a particular power transmission scheme, such as a monopole or bipole HVDC transmission network, but is moreover provided as a generic example illustrating principles of operation of a power transmission network that are useful for understanding the invention. In this manner, the power transmission network 100 may represent, generically, a monopole or bipole scheme, or may represent a multiterminal power transmission scheme, for instance. Hence whilst specific features in the illustration are shown connected to each other with a specific number of connections, it will be understood that this is not intended to be limiting either, but moreover to illustrate a generic connection between features/components. Related, is that relative dimensions or distances between components perceived in the illustration are also not intended to be limiting. It will therefore be understood that principles and features in the network 100 and herein discussed can be applied to networks comprising the controller 200 of FIG. 2, for instance. Furthermore, the methods 400, 500 of FIG. 4 and FIG. 5 may be implemented in the network 100 of FIG. 1. Furthermore, the control logic 600 of FIG. 6 may be implemented in the network 100 of Figure. In addition, the bipole power transmission network 300 of FIG. 3 may be considered a more specific and detailed example of the network 100 of FIG. 1.

The power transmission network 100 illustrates a first power conversion means 110 (also known as a converter station) and a second power conversion means 120. The power conversion means 110, 120, convert AC power to DC power (and vice versa), acting essentially as a rectifier (when converting AC power to DC power for transmission) and an inverter (when receiving DC power and converting to AC power). The power conversion means 110, 120, may each comprise a single converter in the case of a monopole system, or two converters in the case of a bipole system. The power conversion means 110, 120, may represent a plurality of converter stations arranged as a multi-terminal power transmission system. Generically, the first power conversion means 110 comprises a first AC side 110*a* and a first DC side 110*b*. Generically, the second power conversion means 120 comprises a second AC side 120*a* and a second DC side 120*b*.

The first power conversion means 110 is illustrated as being connected to a first AC network 140. The first AC network 140 is illustrated as being connected to the first AC side 110*a* of the first power conversion means 110.

The second power conversion means 120 is illustrated as being connected to a second AC network 150. The second AC network 150 is illustrated as being connected to the second AC side 120*a* of the second power conversion means 120. The first AC network 140 and/or second AC network 150 may be electrical power transmission systems comprising power generation apparatus, transmission apparatus, distribution apparatus, and electrical loads. The first AC network 140 and/or second AC network 150 may comprise a renewable power generation network such as a wind-power generation network, solar-power generation network, bio-power generation network. The first AC network 140 or second AC network 150 may be a consumer network. By way of non-limiting example, the first AC network 140 may be a consumer network, with second AC network 150 being a power generation network, for instance.

Also illustrated is a power transmission medium 130 interconnecting the first power conversion means 110 and the second power conversion means 120. The power transmission medium 130 is connected between the first DC side 110*b* of first power conversion means 110 and the second DC side 120*b* of the second power conversion means 120. The power transmission medium 130 may comprise electrical cables and other electrical components interconnecting the first and second power conversion means 110, 120. For instance, the power transmission medium 130 may comprise a conductor providing a first electrical pole; and/or a conductor providing a second electrical pole. A neutral arrangement may also be provided interconnecting the first and second power conversion means 110, 120. The power transmission medium 130 provides the medium through which DC power is transmitted between the power conversion means 120, 130.

The operation of the power transmission system 100 can be generically described by the following example. The second AC network 150 generates AC power that is provided to second power conversion means 120 at the second AC side 120*a*. The second power conversion means 120 converts the received AC power to a DC power for transmission to first power conversion means 110. The DC power is transmitted from second DC side 120*b* over the power transmission medium 130 to the first DC side 110*b* of first power conversion means 110. The first power conversion means 110 converts the received DC power back to an AC power. The AC power is then provided from first AC side 110*a* to first AC network 140 for consumption, for instance. In particular examples, the power conversion means 110 and 120 may be geographically remote. For instance, the first power conversion means 110 may reside on-shore and the second power conversion means 120 may reside off-shore with an off-shore windfarm.

It will be appreciated that various other electrical components may be located at any particular location or with any particular feature/component in the example 100. These may include switches, circuit breakers, transformers, resistors, reactors, surge arrestors, harmonic filters and other components well known in the art.

It will be appreciated that converters or power conversion means may comprise a number of different technologies such as voltage sourced converters (for instance using insulated gate bipolar transistor (IGBT) valves). Such converters may generally be considered to use 'power electronics'. Power electronic converters may comprise multi-level voltage sourced converters, for instance.

It will be appreciated that cables used as power transmission mediums may comprise the following non-limiting examples of crosslinked polyethylene (XLPE) and/or mass impregnated (MI) insulation cables. Such cables may comprise a conductor (such as copper or Aluminium) surrounded by a layer of insulation. Dimensions of cables and their associated layers may be varied according to the specific application (and in particular, operational voltage requirements). Cables may further comprise strengthening or 'armouring' in applications such as subsea installation. Cables may further comprise sheaths/screens that are earthed at one or more locations.

Moreover, it will be understood that the power transmission network 100 may be used with three-phase power systems. In a three-phase power system, three conductors supply respective first, second and third phases of AC power to a consumer. Each of the first, second and third phases will typically have equal magnitude voltages or currents, which are displaced in phase from each other by 120°.

In a three-phase power system, phase currents and voltages can be represented by three single phase components: a positive sequence component; a negative sequence component; and a zero-sequence component. It is the positive sequence component that rotates in phase in accordance with the power system. Hence, in the idealistic scenario, only positive sequence voltage/current will exist. It will be understood that an unbalance in voltage or current between the first, second and third-phases, of a three-phase system, in magnitude or phase angle, can give rise to undesirable negative or zero-sequence components. Such an unbalance can be caused by fault conditions, for instance in the AC networks 140, 150.

The power transmission network 100 may be operated using methods such as synchronous grid forming (SGFM) wherein either or both of the power conversion means 110, 120 behave as three-phase, positive-phase sequence AC voltage sources behind an impedance, that operate at a frequency synchronous with over SGFM sources connected to the power transmission network 100.

The power transmission network 100 may further comprise a controller for controlling the operation of components of the power transmission network 100. For instance, a controller may be provided for executing the methods described herein. Such a controller may control the power conversion means 110, 120, for instance. Such a controller may be referred to as a controller means or control means. The controller may be the controller 200 of FIG. 2.

Figure 2:
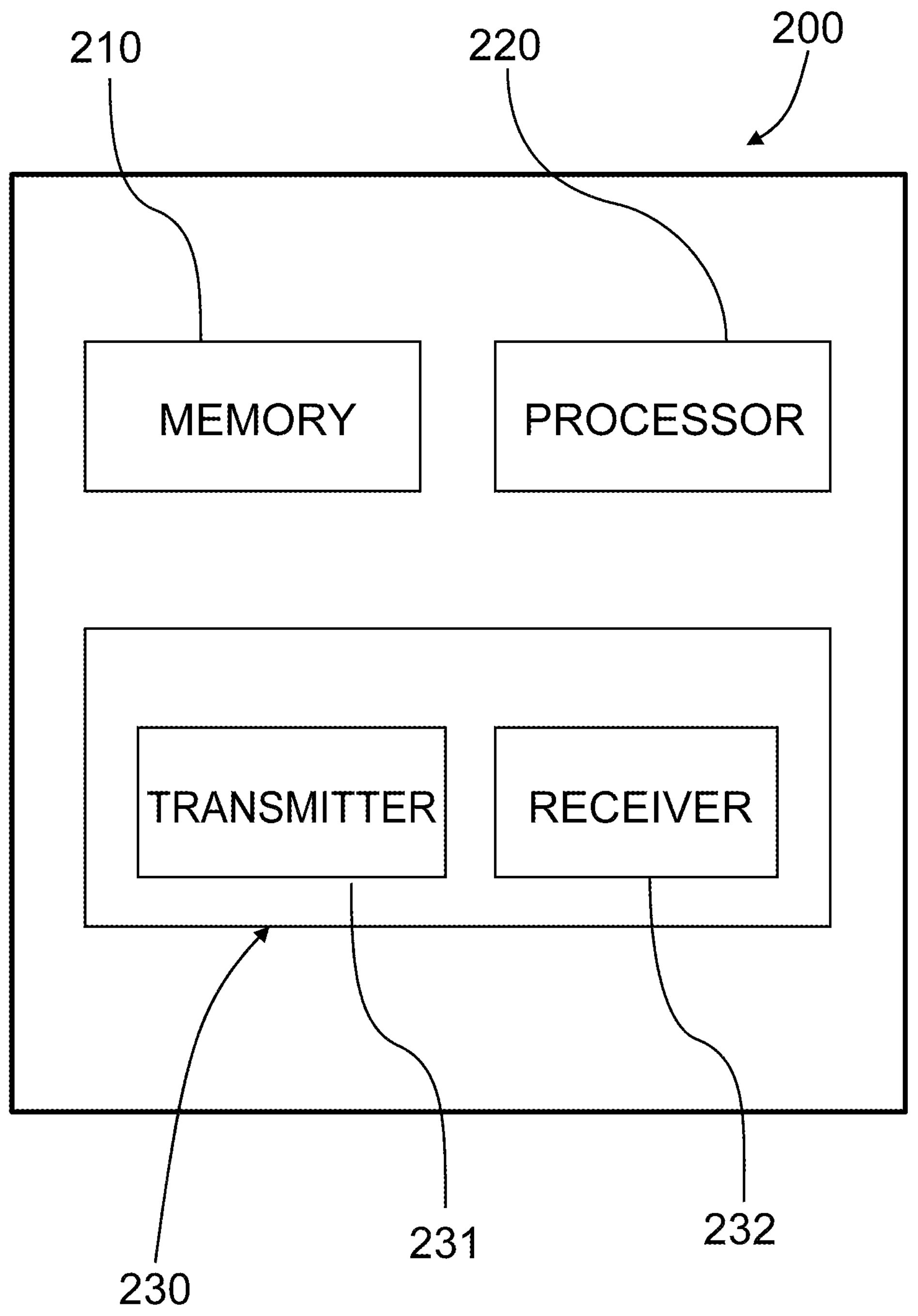
FIG. 2 shows an embodiment of a controller for a power transmission network.

FIG. 2 illustrates an embodiment of a controller 200 as may be used in implementing the invention described herein.

The controller 200 comprises a memory 210 and at least one processor 220. The memory 210 comprises computer-readable instructions, which when executed by the at least one processor 220, cause the controller 200 to perform the method/s described herein.

The controller 200 is illustrated as comprising a transceiver arrangement 230 which may comprise a separate transmitter 231 and receiver 232. The transceiver arrangement 230 may be used to operatively communicate with other components or features of embodiments described herein either directly or via a further interface such as a network interface. The transceiver arrangement 230 may for instance send and receive control signals using transmitter 231 and receiver 232. The control signals may contain or define electrical control parameters such as reference currents or reference voltages.

The at least one processor 220 is capable of executing computer-readable instructions and/or performing logical operations. The at least one processor 220 may be a microcontroller, microprocessor, central processing unit (CPU), field programmable gate array (FPGA) or similar programmable controller. The controller may further comprise a user input device and/or output device. The processor 220 is communicatively coupled to the memory 210 and may in certain embodiments be coupled to the transceiver 230.

The memory 210 may be a computer readable storage medium. For instance, the memory 210 may include a non-volatile computer storage medium. For example, the memory 210 may include a hard disk drive, flash memory etc.

Whilst not illustrated, the controller 200 may additionally include a user input device interface and/or a user output device interface, which may allow for visual, audible or haptic inputs/outputs. Examples include interfaces to electronic displays, touchscreens, keyboards, mice, speakers and microphones.

Figure 3:
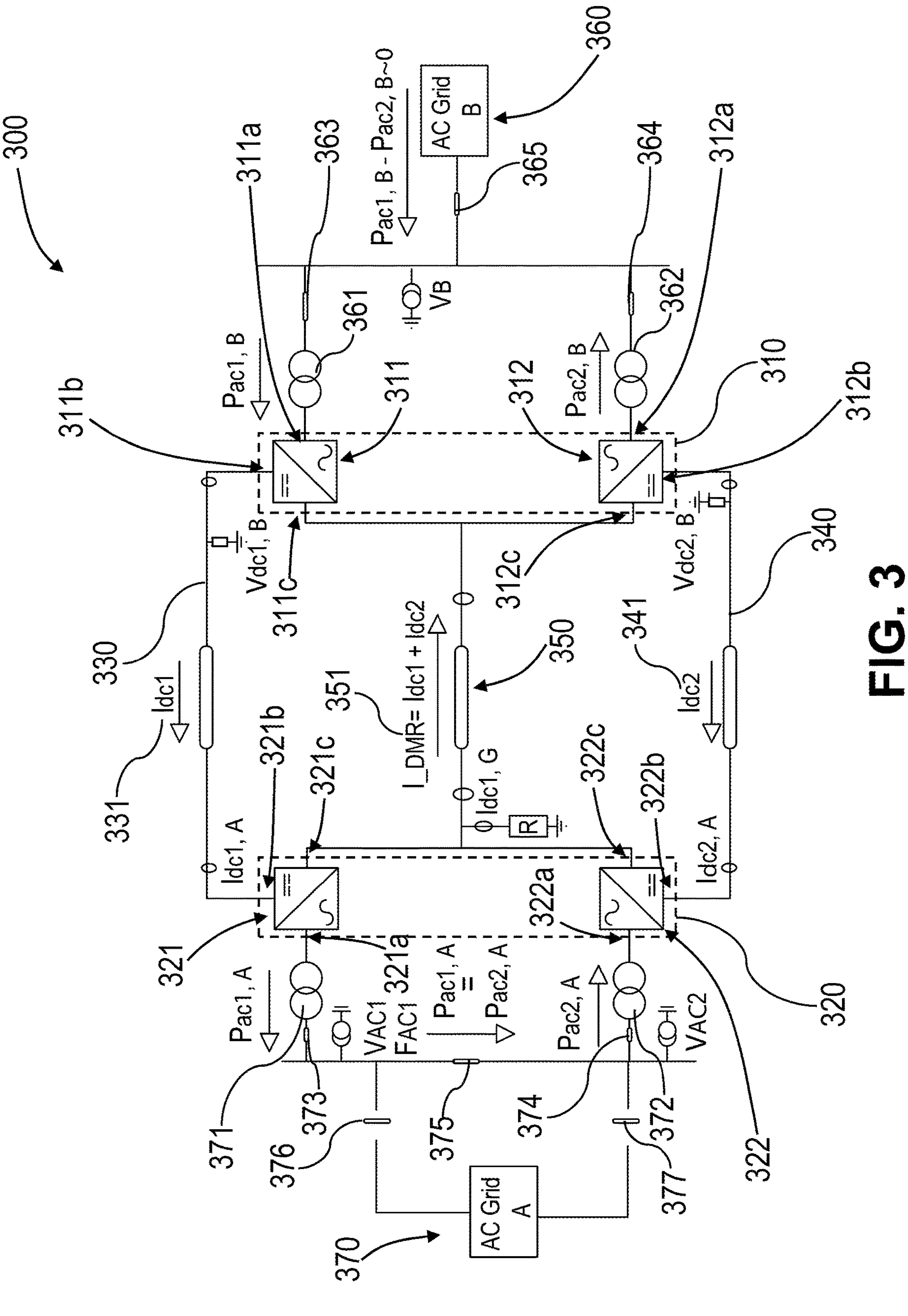
FIG. 3 shows an example, useful for understanding the invention, of a VSC HVDC bipole power transmission network in a round-power operation mode.

FIG. 3 shows an example, useful for understanding the invention, of a VSC HVDC bipole power transmission network 300 in a round-power operation mode.

The bipole power transmission network 300, comprises a first power conversion means 310. The first power conversion means 310 comprises a first power converter 311 having a first AC side represented by first AC side terminal 311*a*. The first power converter 311 also comprises a first DC side represented by the first DC side terminals 311*b* and 311*c*. The first power conversion means 310 also comprises a second power converter 312 having a second AC side represented by second AC side terminal 312*a*, and a second DC side represented by second DC side terminals 312*b* and 312*c*.

The bipole power transmission network 300 further comprises a second power conversion means 320. The second power conversion means 320 comprises a third power converter 321 having a third AC side represented by third AC side terminal 321*a*. The third power converter 321 also comprises a third DC side represented by third DC side terminals 321*b* and 321*c*. The second power conversion means 320 also comprises a fourth power converter 322 having a fourth AC side represented by fourth AC side terminal 322*a*, and a fourth DC side represented by fourth DC side terminals 322*b* and 322*c*.

The bipole power transmission network 300 also comprises a first power transmission means 330 connected between the first DC side terminal 311*b* and the third DC side terminal 321*b*, thereby defining a first electrical pole.

The bipole power transmission network 300 also comprises a second power transmission means 340 electrically connected between the second DC side terminal 312*b* and the fourth DC side terminal 322*b*, thereby defining a second electrical pole.

A neutral arrangement 350, is also shown as being electrically connected to the first, second, third and fourth DC side terminals 311*c*, 312*c*, 321*c*, 322*c*.

The bipole power transmission network 300 is in a configuration for commissioning. As shown, the first and second AC side terminals 311*a*, 312*a*, are electrically connected to an AC network 360 referred to as "AC Grid B". More specifically, the first and second AC side terminals 311*a*, 312*a* connect to the first AC network 360 via transformers 361, 362 and switches 363, 364, 365, which are in the closed (i.e., conducting) configuration.

Furthermore, in this configuration, the third and fourth AC side terminals 321*a*, 322*a*, are not connected to the second AC network 370. This is because switches 376, 377 are in an open (i.e., non conducting) configuration. Instead, the third and fourth AC side terminals 321*a*, 322*a* are electrically connected to each other via transformers 371, 372 and switches 373, 374, 375 which are in the closed (i.e., conducting) configuration.

The bipole power transmission network 300, is further illustrated as being operated in a round-power operation mode. The power flow in this operation mode will now be described.

The power converters 311 and 312 of the first power conversion means 310 are operating in a DC voltage control mode. Hence they respectively control the DC voltage on the first power transmission means 330 and the second power transmission means 340. The power converters 311 and 312 control the DC voltage to a set value by changing their power output. For instance, if the DC voltage on the transmission means 330, 340, is lower than the set value, the converters 311, 312, will pump more power onto the transmission means 330, 340, from the AC network 360. Furthermore, when the DC voltage on the transmission means 330, 340, is higher than the set value, the converters 311, 312 will extract power to the AC network 360.

At least one of the power converters 321, 322 of the second power conversion means 320, is selected to be operated in constant voltage and frequency control i.e., setting the magnitude and frequency of the AC voltage on the AC bus connecting the third and fourth AC side terminals 321*a*, 322*a*.

At least one of the power converters 321, 322, of the second power conversion means 320, is selected to be operated in a power control mode. In this mode, the converter 321, 322, adjusts the power flowing around the network 300.

Hence, a round power mode can be operated in the network 300 as follows. A power denoted 'Pac1,B' is transferred through the first converter 311 to the first transmission means 330. The third converter 321 transfers this power from the first transmission means 330 to the AC bus connected the third and fourth AC side terminals 321*a*, 322*a*. The power, now denoted 'Pac1, A' is received by the fourth converter 322. This power, now denoted 'Pac2, A' is equal to 'Pac1, A', and is transferred by the fourth converter 322 to the second transmission means 340. The second converter, 312, transfers this power, now referred to as 'Pac2, B', to the AC network 360. The difference between the power 'Pac1, B' originally provided by the AC network 360, and that received by the AC network 360 as 'Pac2, B', approximates zero. Put differently, other than system losses, no power has been consumed in the round-power operation.

As evident in FIG. 3, during round-power operation, a current 331 flows on the first transmission means 330. The current 331 is denoted 'Idc1' and flows from the first converter 311 to the third converter 321. Furthermore, a current 341 flows on the second transmission means 340. The current 341 is denoted 'Idc2' and flows from the second converter 312 to the fourth converter 322. The currents 331, 341, flow in the same direction owing to the different polarities of the first and second transmission means 330, 340 (the electrical poles). The combination of the currents 331, 341, must therefore flow back through the neutral arrangement 350. The combined current 351 is referred to herein as a first electrical current, denoted 'I_DMR'. It is this combined current 351 that can exceed the electrical rating of the neutral arrangement 350 during round-power mode and hence contribute to damage of, or affect the operation of, components on the neutral arrangement 350. Moreover, a tripping of the bipole power transmission scheme 300 could ultimately occur if the combined current 351 on the neutral arrangement 350 is not managed.

As described herein, the invention tends to solve the above-mentioned problems by controlling the power flow in a round-power operation or similar as a function of the electrical current 351 flowing through the neutral arrangement 350, such that the electrical current 351 is regulated to a reference value (i.e., does not exceed a current limit for the neutral arrangement, which may be the maximum current flowing through the neutral arrangement 350, and hence is kept within a maximum current rating).

Figure 4:
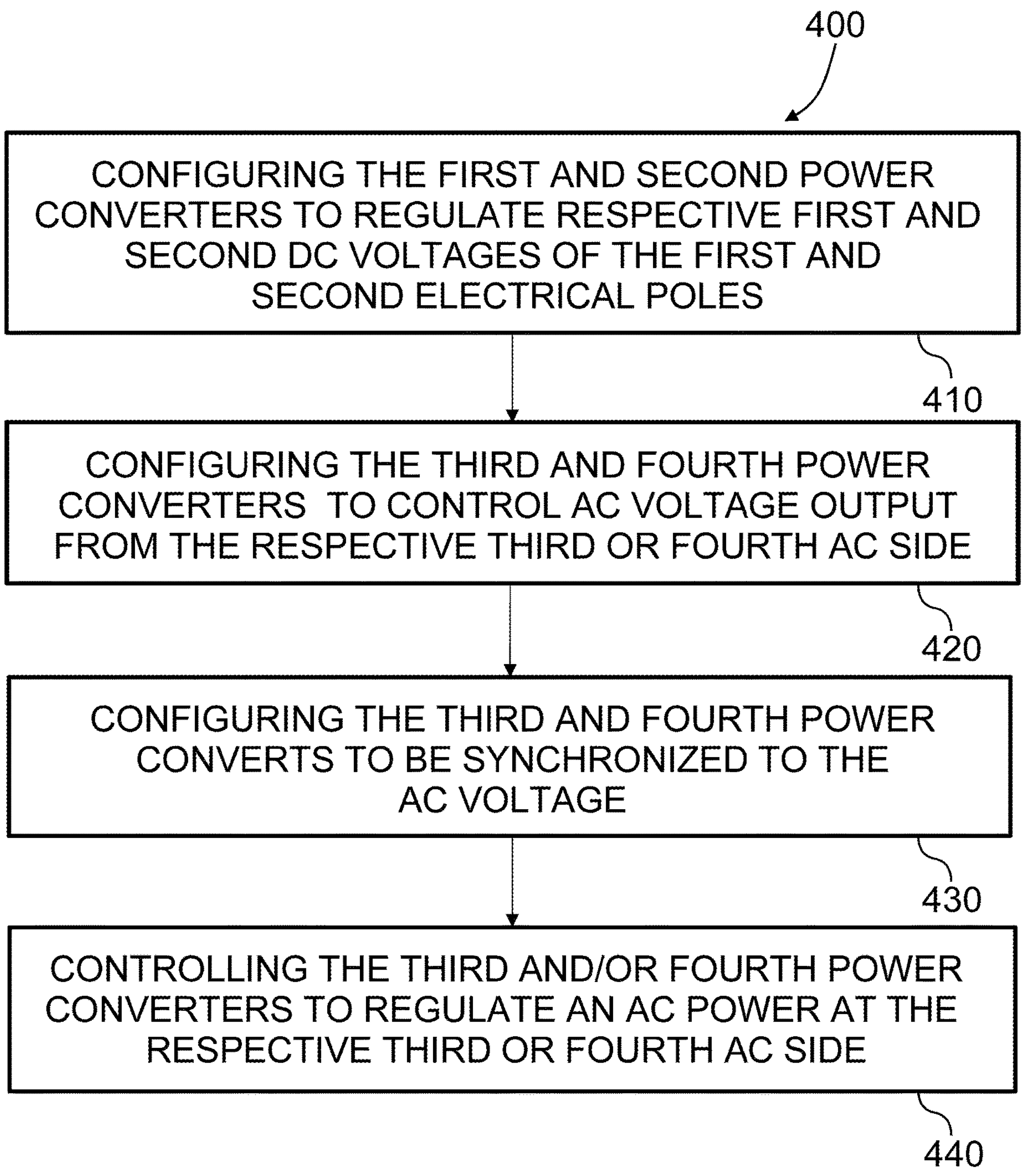
FIG. 4 shows an embodiment of a method in a bipole power transmission network.

FIG. 4 shows an embodiment of a computer-implemented method 400 of controlling a bipole power transmission network, the bipole power transmission network comprising a first power conversion means comprising first and second power converters having respective first and second alternating current (AC) sides and respective first and second direct current (DC) sides, a second power conversion means comprising third and fourth power converters having respective third and fourth AC sides and respective third and fourth DC sides, a first power transmission means electrically connected between the first and third DC sides and defining a first electrical pole, a second power transmission means electrically connected between the second and fourth DC sides and defining a second electrical pole, and a neutral arrangement connected to the first, second, third and fourth DC sides, wherein the first and second AC sides are electrically connected to an AC network, and wherein the third and fourth AC sides are electrically connected to each other. The bipole power transmission network may be the network 300 of FIG. 3, for instance.

A first step 410 comprises, configuring the first and second power converters to regulate respective first and second DC voltages of the first and second electrical poles. The first step 410 may comprise controlling both converters 311, 312 of FIG. 3, for instance, to regulate the DC voltages (vdc1_B and Vdc2_B, as illustrated in the Figure) i.e., by using DC voltage control. The converters 311, 312 may be controlled using a Grid Following (GFL) approach (i.e. where the converters 311, 312 are controlled in such way that matches the magnitude of AC grid voltage and frequency and can provide reactive current equal to the steady state rated current during AC faults), or by using Synchronous Grid Forming control (SGFC) (i.e. where the converters 311, 312 are controlled in such way that can regulate both instantaneous AC frequency and AC voltage, and also able to operate in parallel with other AC frequency regulating equipment and converters. Such a converter is also capable to provide reactive current equal to the steady state rated current during AC faults).

A further step 420 comprises, configuring the third and/or fourth power converter to control an AC voltage output from the respective third or fourth AC side. The further step 420 may comprise an initial step of energising the power transmission means 330 and 340 of FIG. 3 and energising both converters 321, 322, while keeping the switches 376, 377 (i.e., the main circuit breakers) open. Furthermore, the step 420 may comprise controlling one or the electrical poles of the second power conversion means 320 (i.e., the offshore station) in a Grid forming control (GFC) (i.e. where the converter 321 or 322 is controlled in such a way that can regulate both instantaneous AC frequency (Fac1, denoted in FIG. 3) and AC voltage (Vac1, denoted in FIG. 3) by using constant AC voltage to regulate the AC voltage magnitude and fixed nominal frequency with a voltage controller oscillator (VCO). This allows for generation of the phase angle to form the AC voltage at the second power conversion means 320 (i.e., the offshore side). Put differently, a Master converter can be established to form an AC Voltage source.

A further step 430 comprises, configuring the third and/or fourth power converters to be synchronised to the AC voltage. This further step 430 may comprise closing the switch 373 in FIG. 3 (i.e., the main circuit breaker for the first electrical pole) and closing the switch 374 (i.e., the main circuit breaker of the second electrical pole), while keeping open the switch 375 (i.e., the bus coupler (BC)) for instance. The converter 322 of the second pole may then be synchronised to the first energised pole and the switch 375 closed.

A further step 440 comprises, controlling the third and/or fourth power converter to regulate an AC power at the respective third or fourth AC side and/or to regulate a DC power at the respective third or fourth DC side, as function of: a measured value of a first electrical current flowing through the neutral arrangement; and a reference value for the first electrical current; such that, in-use, electrical power from the AC network flowing from the first power conversion means to the second power conversion means and returning to the first power conversion means, or vice-versa, is regulated to control the first electrical current in accordance with the reference value. The further step 440 may comprise controlling the third and/or fourth power converter to regulate the real power by controlling the DC power measured at the DC point of common coupling (PCC) of the second pole or AC power at the AC PCC of the second pole, by using either GFL or SGFC. The AC voltage or reactive power can be used to support the AC voltage at the AC PCC offshore. The actual power output (corresponding to a DC power demand) may be altered by DMR current control, in order to regulate the current in the DMR not to exceed a pre-defined value (nominally this reference value may be equal to 1 PU).

It will be understood that current control of the neutral arrangement 350 of FIG. 3, in accordance with the method 400 of FIG. 4, tends to determine and drive the power demand of the second electrical pole at the power conversion means 320 in a manner that does not exceed the current rating/reference value of the neutral arrangement 350.

Figure 5:
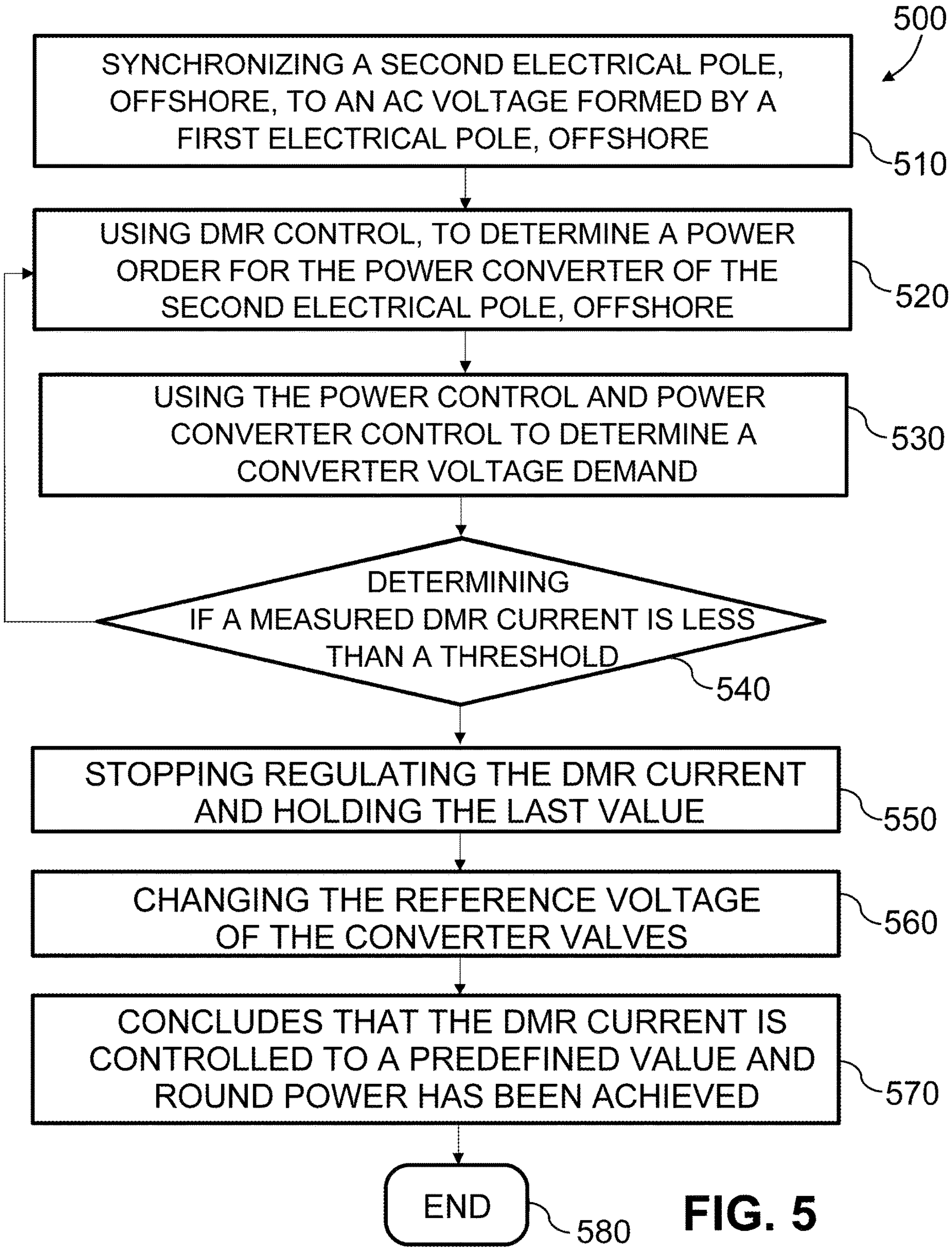
FIG. 5 shows a further embodiment of a method in a bipole power transmission network.

FIG. 5 shows a further embodiment of a method 500 for controlling a bipole power transmission network. The method 500 may be considered as adding further detail to the method 400. More specifically, the method 500 focuses on the synchronization of offshore power converters and DMR current control. The bipole power transmission network may be the network 300 of FIG. 3, and more specifically such a network wherein the first power conversion means 310 is an onshore converter station and the second power conversion means 320 is an offshore converter station.

A first step 510 comprises, synchronizing a second electrical pole, offshore, to an AC voltage formed by a first electrical pole, offshore. This essentially forms the AC system offshore. Synchronisation techniques for poles and power converters would be understood by a person skilled in the art.

A further step 520 comprises, using DMR current control, to determine a power order for the power control of the second electrical pole, offshore.

A further step 530 comprises, using the power control and power converter control to determine a converter voltage demand.

A further step 540 comprises, determining if a measured DMR current (i.e., the first electrical current referred to herein) is less than a threshold (i.e., the reference value referred to herein). If the determination 540 is that the threshold is not exceeded, the method 500 restarts at step 520. If the determination 540 is that the threshold is exceeded, the method 500 progresses to step 550.

A further step 550 comprises, stopping regulating the DMR current and holding the last value (i.e., the last power order). This essentially is preventing more current being driven to the DMR.

A further step 560 comprises, changing the reference voltage of the converter valves which is determined by the converter controlled according to GFL or SGFC techniques.

A further step 570 concludes that the DMR current is controlled to a predefined value (i.e., the reference value) and round power mode has been achieved.

At step 580, the method 500 ends.

Figure 6:
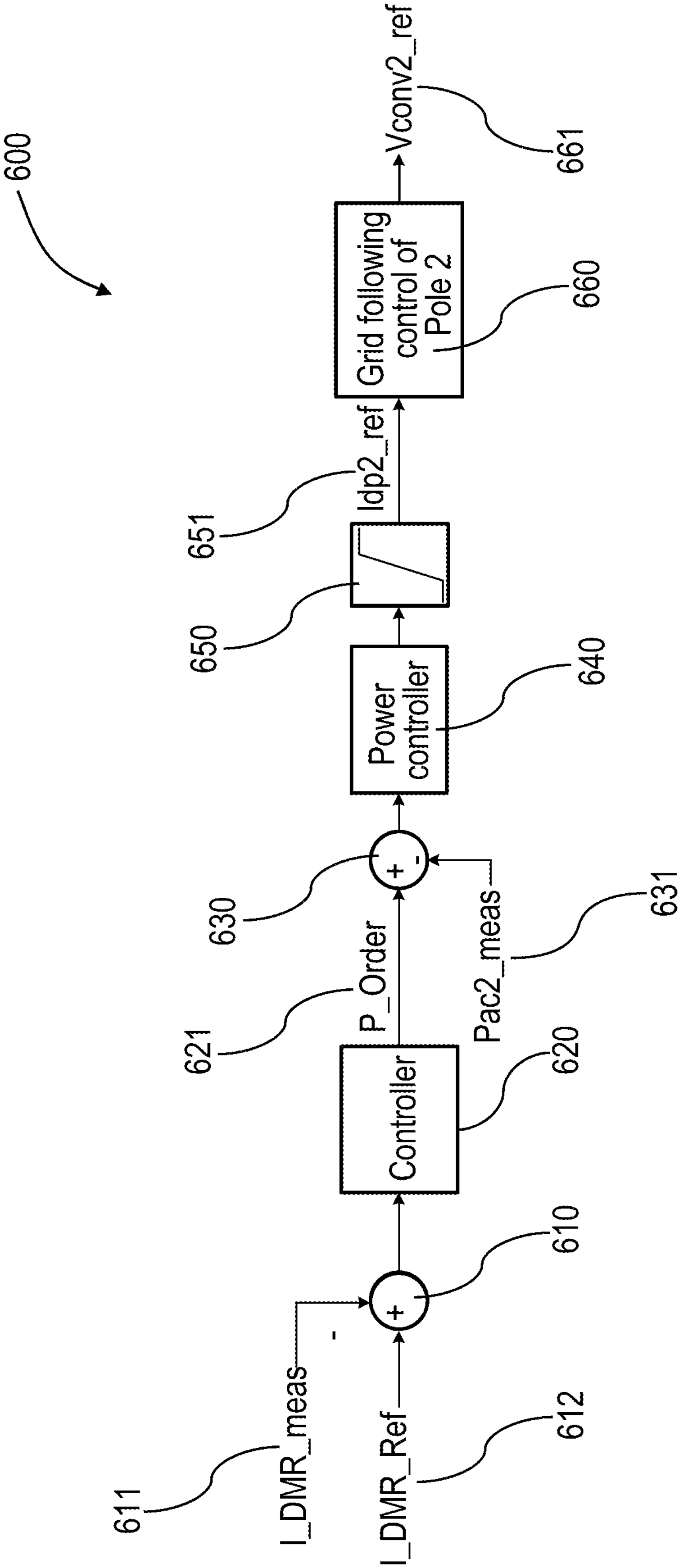
FIG. 6 shows an embodiment of control logic in a bipole power transmission network.

FIG. 6 shows an embodiment 600 of control logic in a bipole power transmission network. More specifically, the embodiment 600 shows DMR current control for the neutral arrangement 350 of FIG. 3 by controlling the power infeed of the fourth converter 322.

The embodiment 600 shows a first summing junction 610. The first summing junction 610 combines a measured value 611 of a first electrical current flowing in the neutral arrangement 350 of FIG. 3, with a limit value or reference value 612 for the first electrical current. The measured value 611 is denoted 'I_DMR_meas'. The limit or reference value 612 is denoted 'I_DMR_Ref'. More specifically, the first summing junction 610 calculates a difference between the values 611 and 612, and provides this as an input value to a controller 620. The limit or reference value 612 may be zero, or 0.5 PU, or 1 PU, for instance. It is a reference value that the control logic 600 is configured to drive the measured value 611 towards.

The controller 620 generates, from the input value, a power order 621. The power order 621 is denoted 'P_order'. The power order 621 is provided to a second summing junction 630. At a general level, the power order 621 is the power order required to drive the measured value 611 of the first electrical current, towards the limit or reference value 612.

The second summing junction 630 combines the power order 621 with a measured value 631 of the AC power at the AC side 322*a* of the fourth converter 322 of FIG. 3. The measured value 631 is denoted 'Pac2_meas'. More specifically, the second summing junction 630 calculates a difference between the values 621 and 631 and provides the difference as an input to a power controller 640.

The power controller 640 provides a current reference 651 denoted 'Idp2_ref' which is passed through a limiting function 650. The limiting function 650 puts a minimum and maximum limit of the current reference 651. This is provided to the grid following control 660 of the second electrical pole/the fourth converter 322 of FIG. 3.

The grid following control 660 generates a voltage reference 661 for the fourth converter 322 of FIG. 3. The fourth converter 322 of FIG. 3 resultantly adjusts an internal AC voltage angle, based on the reference 661, to achieve the desired power.

The control logic 600 of FIG. 6 shows how a power order 621 can be fed from a current control logic 620 that is trying to drive a measured current 611 towards a reference/limit value 612. The features 610-621 may therefore reside within a current control controller, with the features 630-661 residing within a controller for a power converter, for instance.

Applying the control logic 600 of FIG. 6 to the bipole power transmission network 300 of FIG. 3, a round power operational mode can be established. The general operation is that the power infeed at the fourth converter 322 is adjusted, which for the purposes of this example is considered to be an increase in the power infeed. This leads to more power being drawn from the third converter 321. In turn, this leads to a DC voltage dip on the first power transmission means 330. Hence, the first converter 311 gives more power to the power transmission means 330 to compensate. Furthermore, the fourth converter 322, now outputs more power to second transmission means 340 causing a voltage rise on the second power transmission means 340. This in turn leads to the second converter 312 taking more power out of the power transmission means 340 to maintain the DC voltage level.

Figure 7:
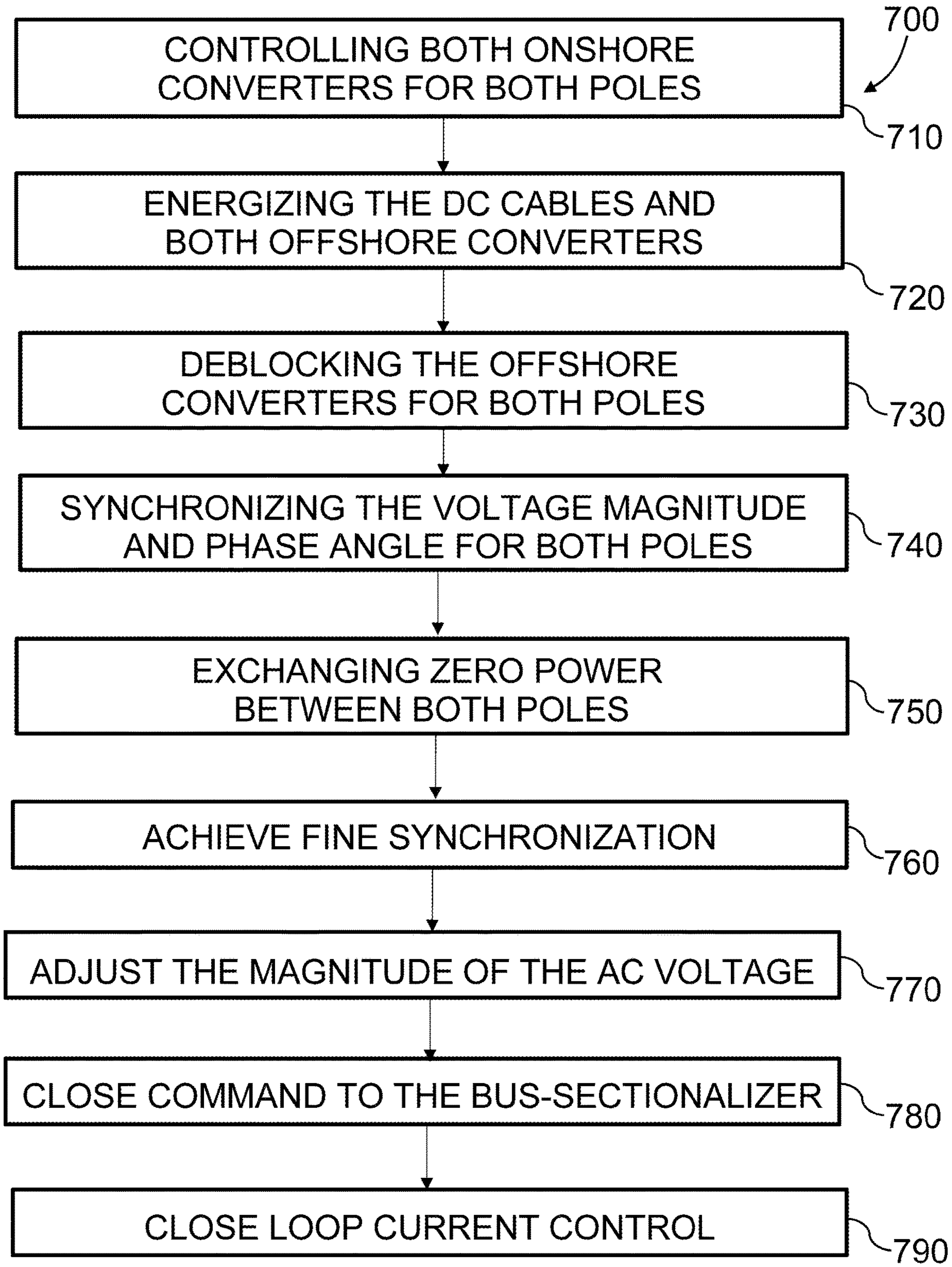
FIG. 7 shows a further embodiment of a method in a bipole power transmission network.

As an alternative embodiment, a difference between a phase angle of the AC voltage output by the third converter 321 and a phase angle of the AC voltage output by the fourth converter 322, can be introduced, as a function of the measured value and reference value of the neutral arrangement (i.e., of the DMR). In such an alternative embodiment, both offshore converters (i.e., the third converter 321 and fourth converter 322) are operated in a grid forming control mode). This will now be described by way of the example 700 of FIG. 7.

A first step 710 comprises, controlling both onshore converters (i.e., first converter 311 and second converter 312) for both poles (Pole 1, and Pole 2) to regulate their respective DC voltages i.e. by using DC voltage control. These converters 311 and 312 can be either controlled using a Grid Following (GFL) approach (i.e. where the converter is controlled in such way that matches the magnitude of AC grid voltage and frequency and can provide reactive current equal to the steady state rated current during AC faults), or by using Synchronous Grid Forming control (SGFC) (i.e. where the converter is controlled in such way that can regulate both instantaneous AC frequency and AC voltage, and also able to operate in parallel with other AC frequency regulating equipment and converters. Such a converter is also capable of providing reactive current equal to the steady-state rated current during AC faults).

A further step 720 comprises, energising the DC cables (i.e., first and second power transmission means 330, 340) and both offshore converters (i.e., third and fourth converters 321, 322). This may be performed while the bus-sectionaliser 375 for the offshore side is still open.

In a further step 730, the offshore converters (i.e., third and fourth converters 321, 322) for both poles shall be deblocked while the main circuit breaker at the offshore side is open and start ramping the voltage demand to reach nominal value.

In a further step 740, whilst the two poles are connected to two separated buses, the voltage magnitude and phase angle for both poles shall be synchronized by keeping the magnitude and phase angle as close as possible by having minimum difference between the magnitudes and phase angle. This may be achieved by using a central or virtual VCO for bipole control.

In a further step 750, when an instruction to operate in balanced bipole mode is received i.e., by exchanging zero power between the two poles which is achieved by demanding zero DMR current reference, a close command is issued to the bus-sectionaliser.

In a further step 760, if there was a difference between the phase angle of a measure line winding voltage of either of the electrical poles (i.e., of either of Pole 1 and Pole 2, one approach to achieve fine synchronization could be to have a positive phase jump applied on the converter whose phase angle of line winding voltage is lagging with respect to the other. This may be achieved by using open loop and/or close loop phase angle regulation.

In a further step 770, the magnitude of the AC voltage (i.e., output from third and fourth converters 321, 322) may be adjusted by using a closed loop AC voltage control i.e., by adjusting the order of the converter whose phase angle of line winding voltage is lagging with respect to the other.

In a further step 780, after applying the phase jump and voltage magnitude adjustment, once the measured phase difference and voltage magnitude are within a predefined set of small values, a close command to the bus-sectionaliser is issued.

In a further step 790, a closed loop current control is used to regulate the DMR measured current not to exceed its rated/nominal current value and/or less, by using a demand signal entered by the operator via a human-machine-interface. This is to determine the phase angle difference that shall be added as an input to one of the VCOs of the first or second electrical poles. This leads to having unbalanced power where one pole will exchange power from the DC to AC side of the converter and the second pole will exchange power from AC to DC side. As a result, the power round mode can be established.

Figure 8:
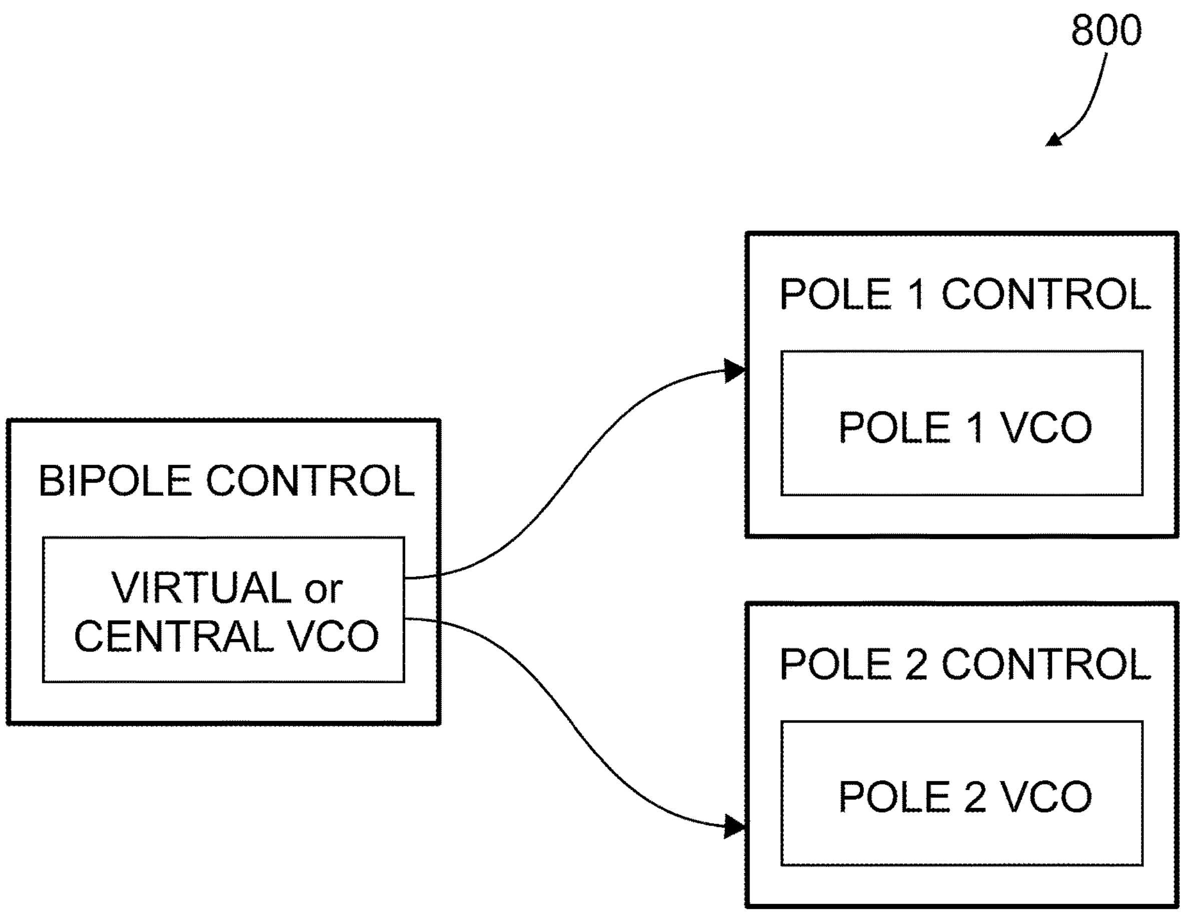
FIG. 8 shows an example of virtual or central VCO for bipole control in accordance with FIG. 7.

FIG. 8 shows an example 800 of a virtual or central VCO for bipole control, as referred to in step 740 of the method 700.

Figure 9:
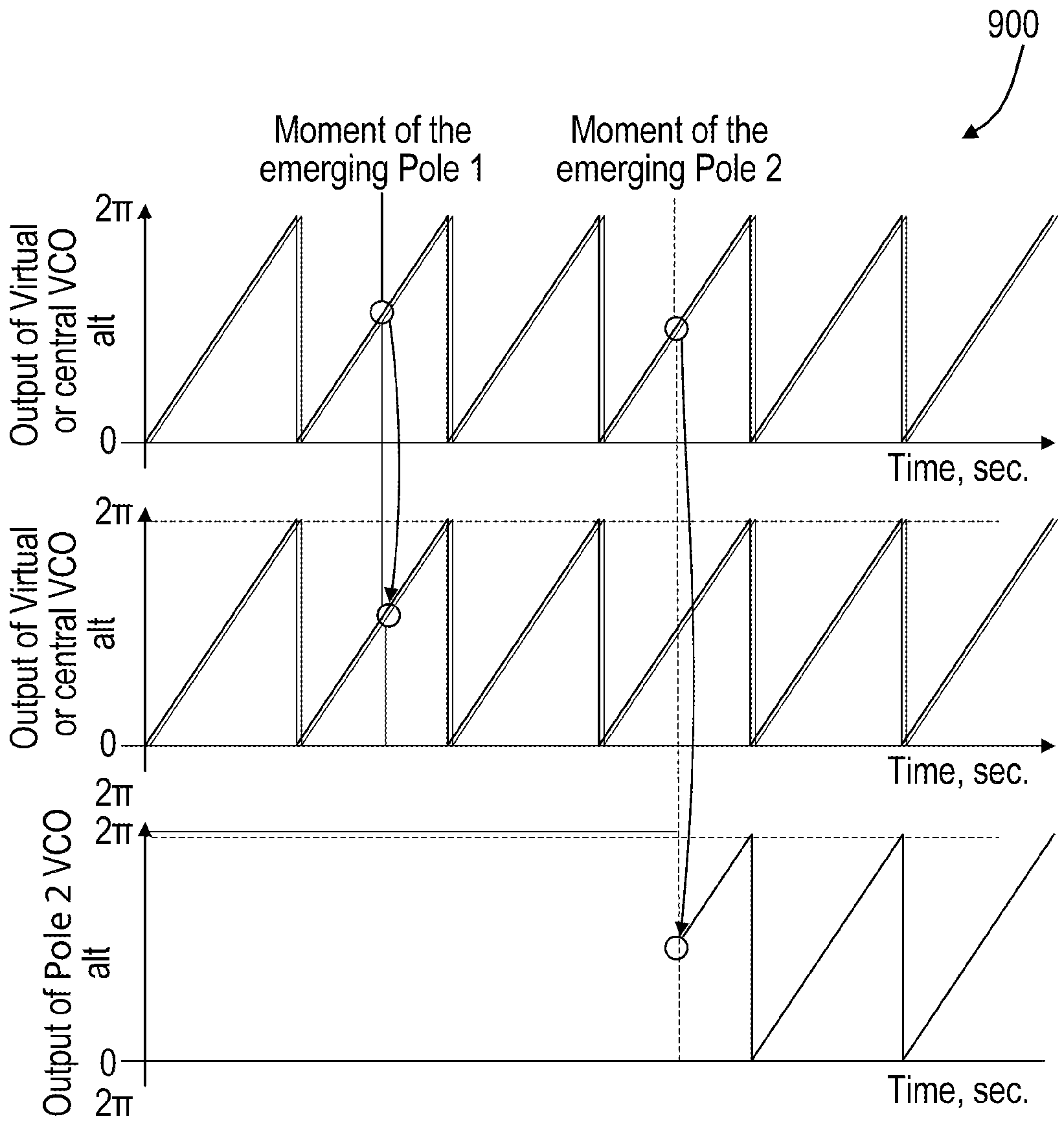
FIG. 9 shows an example of the outputs of a virtual or central VCO for bipole control, and the outputs of VCOs for converters, in accordance with FIG. 7.
Figure 10:
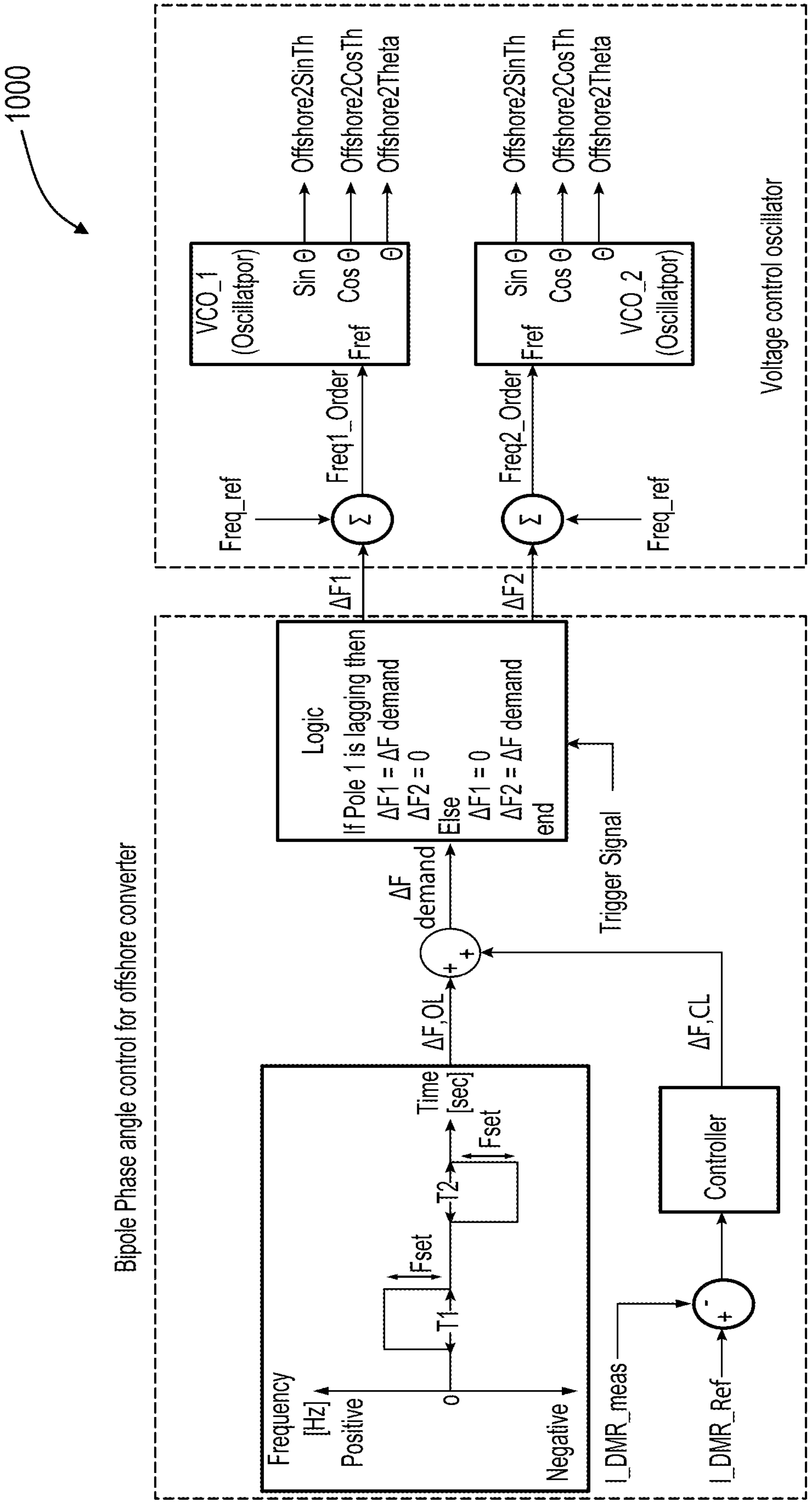
FIG. 10 shows an example of phase-angle regulation in accordance with FIG. 7.

FIG. 9 shows an example 900 of the output of a virtual and central VCO for bipole control, and the output of respective VCOs for third and fourth converters 321, 322, as referred to in step 740 of the method 700. FIG. 10 shows an example 1000—of phase angle regulation as referred to in step 760 of the method 700.

Figure 11:
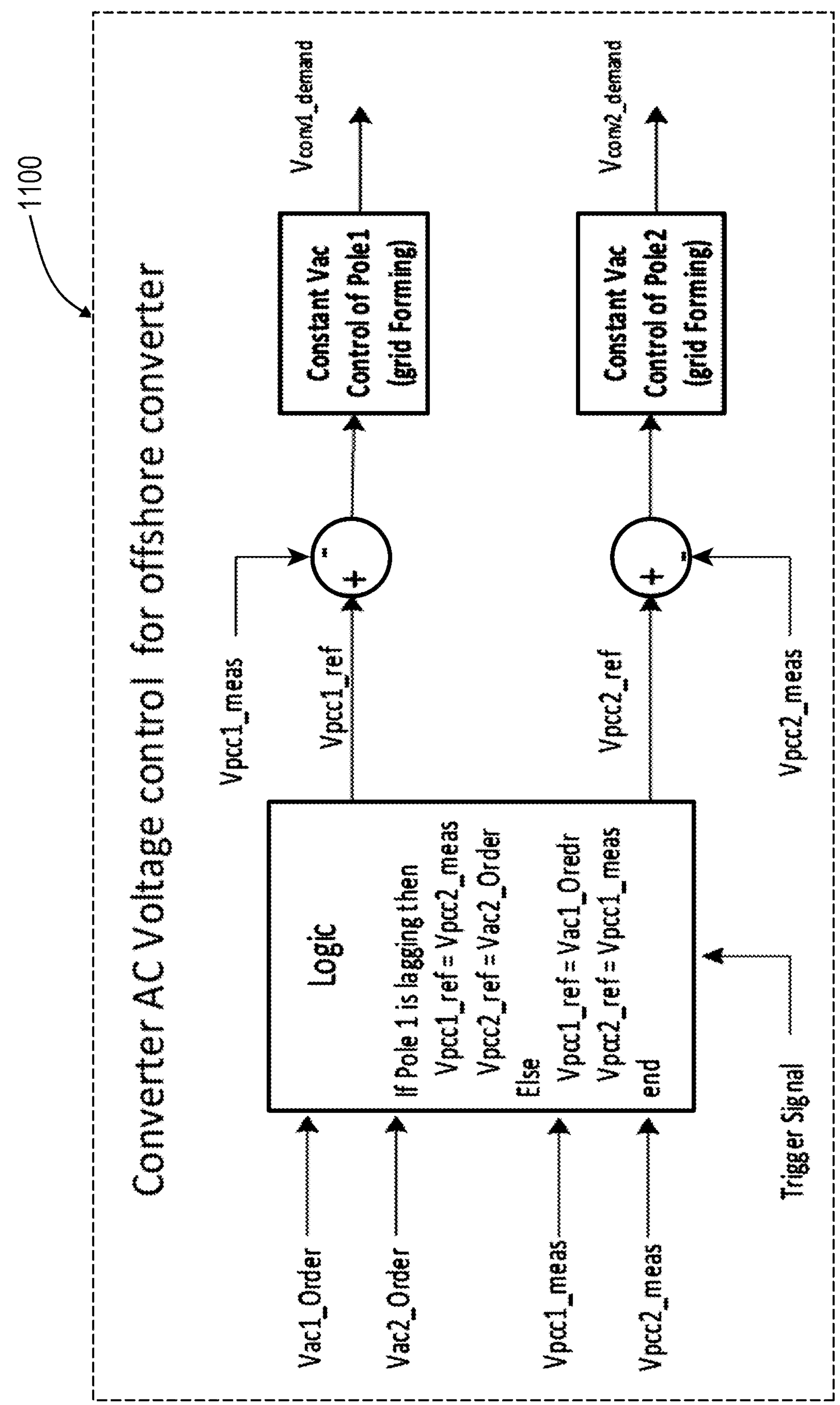
FIG. 11 shows an example of AC voltage control in accordance with FIG. 7.

FIG. 11 shows an example 1100 AC voltage control for an offshore converter, as referred to in step 770 of the method 700.

Whilst the embodiments described herein may indicate the use of a reference value that is 1 PU, for instance, a different reference value may be chosen depending on application or on the HVDC scheme. For instance, a higher or lower value may be chosen, i.e., 1.1 PU, 1.2 PU, 0.8 PU, 0.5 PU, 0.25 PU, 0.1 PU or zero.

It will be understood that whilst a specific onshore/offshore application, and more specifically windfarm application, is relevant, this is not intended to be limiting. The principles of the invention are applicable to any HVDC power transmission scheme whereby a round power operation mode or similar is utilized for commissioning purposes.

Whilst the embodiments described herein show a bipole power transmission network having an AC side of one of the power conversion means (i.e., converter stations) disconnected from an AC network (i.e., not connected to the power generation network, which may be a windfarm), this is only a test configuration of that bipole power transmission network to enable round power (i.e, power circulating) operation. Put differently, the bipole power transmission network is still suitable for connecting at both converter stations, to respective AC networks, and the disconnection is merely temporary for commissioning purposes. Indeed the disconnections step may be a step in the methods described herein. Related is that the connection of the AC sides to each other via an AC bus or otherwise, for one of the converter stations, may also be temporary. Put differently, this is a connection made for the purposes of testing the bipole power transmission network. It can be implemented using switches/switchgear, or circuit breakers, for instance. Indeed, the connection of one AC side of a converter to another AC side of another converter, may be a step in the methods described herein. Related is that whilst a "round power mode" of operation is referred to within this disclosure, this is not intended to be limiting. For instance, the embodiments described herein tend to also be applicable where two poles of bipole transmission system could be used to connect two independent AC networks.

Furthermore, synchronization techniques for power converters, would be understood by a person skilled in the art.

In addition, references to a neutral arrangement and a power transmission means being connected to a 'DC side' of a power converter is intended to include said connections being via separate terminals on said 'DC side'. For example, a neutral arrangement may connect to a DC neutral terminal of a DC side of a power converter. A power transmission means may connect to a separate DC terminal of the DC side of the same power converter.

The invention described herein tends to have the advantage of enabling the commissioning of bipole power transmission networks. More specifically commissioning can be performed before the commissioning of an AC network i.e., a power generation network, to which the transmission network is being connected.

The invention described herein tends to allow for commissioning using a round power test methodology or similar, whereby power is circulated from a first converter station to a second converter station and back to the first converter station, via the respective converters and electrical poles.

The invention described herein tends to allow for commissioning using a round power test methodology that respects the current rating of the neutral arrangement in a bipole power transmission network. More specifically, current flowing through the neutral arrangement is regulated in accordance with (i.e., not to not exceed) a reference value.

The invention described herein tends to protect the neutral arrangement and power transmission scheme. More specifically protecting components of the neutral arrangement from damage and protecting operation of the power transmission scheme.

Reference throughout this specification to an example of a particular method or apparatus, or similar language, means that a particular feature, structure, or characteristic described in connection with that example is included in at least one implementation of the method and apparatus described herein. The terms "including", "comprising", "having", and variations thereof, mean "including but not limited to", unless expressly specified otherwise. An enumerated listing of items does not imply that any or all of the items are mutually exclusive, unless expressly specified otherwise. The terms "a", "an", and "the" also refer to "one or more", unless expressly specified otherwise.

As used herein, a list with a conjunction of "and/or" includes any single item in the list or a combination of items in the list. For example, a list of A, B and/or C includes only A, only B, only C, a combination of A and B, a combination of B and C, a combination of A and C or a combination of A, B and C. As used herein, a list using the terminology "one or more of" includes any single item in the list or a combination of items in the list. For example, one or more of A, B and C includes only A, only B, only C, a combination of A and B, a combination of B and C, a combination of A and C or a combination of A, B and C. As used herein, a list using the terminology "one of" includes one, and only one, of any single item in the list. For example, "one of A, B and C" includes only A, only B or only C and excludes combinations of A, B and C. As used herein, "a member selected from the group consisting of A, B, and C" includes one and only one of A, B, or C, and excludes combinations of A, B, and C." As used herein, "a member selected from the group consisting of A, B, and C and combinations thereof" includes only A, only B, only C, a combination of A and B, a combination of B and C, a combination of A and C or a combination of A, B and C.

Aspects of the disclosed method and apparatus are described with reference to schematic flowchart diagrams and/or schematic block diagrams of methods, apparatuses, systems, and program products. It will be understood that each block of the schematic flowchart diagrams and/or schematic block diagrams, and combinations of blocks in the schematic flowchart diagrams and/or schematic block diagrams, can be implemented by code. This code may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the schematic flowchart diagrams and/or schematic block diagrams.

The schematic flowchart diagrams and/or schematic block diagrams in the Figures illustrate the architecture, functionality, and operation of possible implementations of apparatuses, systems, methods, and program products. In this regard, each block in the schematic flowchart diagrams and/or schematic block diagrams may represent a module, segment, or portion of code, which includes one or more executable instructions of the code for implementing the specified logical function(s).

It will be appreciated that numerical values recited herein are merely intended to help illustrate the working of the invention and may vary depending on the requirements of a given power transmission network, component thereof, or power transmission application.

The listing or discussion of apparently prior-published documents or apparently prior-published information in this specification should not necessarily be taken as an acknowledgement that the document or information is part of the state of the art or is common general knowledge.

Preferences and options for a given aspect, feature or parameter of the invention should, unless the context indicates otherwise, be regarded as having been disclosed in combination with any and all preferences and options for all other aspects, features and parameters of the invention.

The disclosure herein also provides a VSC HVDC scheme, comprising a plurality of poles and a plurality of converters, the plurality of poles including at least one positive pole, at least one negative pole and a neutral pole. The converter(s) being connected to the poles and operable in a round power mode where the power flow directions in both poles are in opposite directions, wherein a controller is programmed to configure the scheme in the round power mode and adjust the round power flow through the HVDC system, to keep the maximum current flowing through the neutral pole within a maximum current rating of the neutral pole.

In some embodiments, the controller is programmed to change the power order reference of one of the pole converters, i.e., the converter, which is selected to be a power control converter, as a function of a measured DC current through the neutral pole conductor, to keep the maximum current flowing through the neutral pole within the maximum current rating.

In some embodiments, the power infeed of the converter in power control, can either be adjusted by giving a power order reference, or by changing its converter AC voltage reference directly.

We claim:

1. A computer-implemented method of controlling a bipole power transmission network, the bipole power transmission network comprising a first power conversion means comprising first and second power converters having respective first and second alternating current 'AC' sides and respective first and second direct current 'DC' sides, a second power conversion means comprising third and fourth power converters having respective third and fourth AC sides and respective third and fourth DC sides, a first power transmission means electrically connected between the first and third DC sides and defining a first electrical pole, a second power transmission means electrically connected between the second and fourth DC sides and defining a second electrical pole, and a neutral arrangement connected to the first, second, third and fourth DC sides, wherein the first and second AC sides are electrically connected to an AC network, and wherein the third and fourth AC sides are electrically connected to each other, the method comprising:

configuring the first and second power converters to regulate respective first and second DC voltages of the first and second electrical poles;

configuring the third and/or fourth power converter to control an AC voltage output from the respective third or fourth AC side;

configuring the third and/or fourth power converters to be synchronised to the AC voltage; and controlling the third and/or fourth power converter to regulate an AC power at the respective third or fourth AC side and/or to regulate a DC power at the respective third or fourth DC side, as a function of:

a measured value of a first electrical current flowing through the neutral arrangement; and a reference value for the first electrical current;

such that, in-use, electrical power from the AC network flowing from the first power conversion means to the second power conversion means and returning to the first power conversion means, or vice-versa, is regulated to control the first electrical current in accordance with the reference value.

2. The computer-implemented method of claim 1, wherein the reference value is based on a maximum current rating of one or more components of the neutral arrangement.

3. The computer-implemented method of claim 2, wherein the one or more components are selected from the list of components consisting of:

a surge arrestor;

a neutral switchgear; and a DMR cable/conductor.

4. The computer-implemented method of claim 1, wherein the controlling the third and/or fourth power converter to regulate an AC power comprises:

introducing a difference between a phase angle of the AC voltage output by the third converter and a phase angle of the AC voltage output by the fourth converter, as a function of the measured value and reference value.

5. The computer-implemented method of claim 1, wherein the controlling the third and/or fourth converter to regulate the AC power or the DC power, comprises:

adjusting a reference power or a reference voltage of the third or fourth converters.

6. The computer-implemented method of claim 5, wherein the reference power or reference voltage is selected from the list consisting of:

a power-order reference;

an AC reference voltage;

a DC reference voltage; and a valve reference voltage.

7. The computer-implemented method of claim 5, wherein the adjusting a reference power or reference voltage, comprises:

adjusting the reference power or reference voltage and determining a corresponding nominal measured value of the first electrical current, repeatedly, until the nominal measured value of the first electrical current is substantially equal to the reference value; and then maintaining the respective reference power or reference voltage providing the nominal measured value that is substantially equal to the reference value.

8. The computer-implemented method of claim 1, wherein the configuring the first and second power converters to regulate respective first and second DC voltages of the first and second electrical poles, comprises:

configuring the first and second power converters to operate in either of:

a grid following configuration; or a synchronous grid forming configuration.

9. The computer-implemented method of claim 1, wherein the configuring the third and/or fourth power converter to control the AC voltage, comprises:

controlling the third or fourth power converter to operate in a grid forming configuration, wherein the third or fourth power converter regulates a magnitude and a frequency of the AC voltage.

10. The computer-implemented method of claim 1, wherein the first power conversion means is an onshore converter station, and the second power conversion means is an offshore converter station.

11. The computer-implemented method of claim 1, wherein the bipole power transmission network is a high voltage direct current 'HVDC' power transmission network.

12. The computer-implemented method of claim 1, wherein each of the power converters comprises a voltage sourced converter 'VSC', preferably a modular multilevel 'MMC' converter.

13. A controller for a bipole power transmission network, comprising:

a memory; and at least one processor;

wherein the memory comprises computer-readable instructions which when executed by the at least one processor, cause the controller to perform the method of claim 1.

14. A bipole power transmission network, comprising:

a first power conversion means, comprising:

a first power converter having a first AC side and a first DC side;

a second power converter having a second AC side and a second DC side;

a second power conversion means, comprising:

a third power converter having a third AC side and a third DC side;

a fourth power converter having a fourth AC side and a fourth DC side;

a first power transmission means connected between the first DC side and the third DC side, thereby defining a first electrical pole;

a second power transmission means electrically connected between the second DC side and the fourth DC side, thereby defining a second electrical pole;

a neutral arrangement electrically connected to the first, second, third and fourth DC sides;

wherein the first and second AC sides are electrically connected to an AC network, and wherein the third and fourth AC sides are electrically connected to each other;

wherein the bipole power transmission network further comprises the controller of claim 13.

15. A computer program comprising instructions which when executed by a controller for a bipole power transmission network, cause the controller to perform the method of claim 1.

* * * * *